(12) United States Patent
Chan et al.

(10) Patent No.: US 8,631,970 B2
(45) Date of Patent: Jan. 21, 2014

(54) MULTI-CHAMBER MATERIAL DISPENSING SYSTEM AND METHOD FOR MAKING SAME

(75) Inventors: John Geoffrey Chan, Maineville, OH (US); Lawrence Edward O'Brien, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 1070 days.

(21) Appl. No.: 12/605,001

(22) Filed: Oct. 23, 2009

(65) Prior Publication Data

US 2010/0133294 A1    Jun. 3, 2010

Related U.S. Application Data

(60) Provisional application No. 61/107,905, filed on Oct. 23, 2008.

(51) Int. Cl.
*B65D 35/22* (2006.01)

(52) U.S. Cl.
USPC ............... 222/94; 222/96; 222/107; 425/112; 425/174.4; 383/3; 383/118; 264/458; 264/492; 264/535

(58) Field of Classification Search
USPC ......... 222/92–107; 425/110–112, 174.4, 526; 383/3, 118–120; 264/410, 454, 458, 264/476, 492–496, 531, 535
See application file for complete search history.

(56) References Cited

U.S. PATENT DOCUMENTS

| 3,696,977 | A | | 10/1972 | Davenport et al. |
| 3,764,104 | A | | 10/1973 | Kempton |
| 3,876,115 | A | * | 4/1975 | Venus et al. ................. 222/183 |
| 4,251,032 | A | | 2/1981 | Werding |
| 4,964,540 | A | | 10/1990 | Katz |
| 5,111,971 | A | | 5/1992 | Winer |
| 5,115,944 | A | | 5/1992 | Nikolich |
| 5,143,260 | A | | 9/1992 | Loychuk |
| 5,143,263 | A | | 9/1992 | Newell |
| 5,232,126 | A | | 8/1993 | Winer |
| 5,265,765 | A | | 11/1993 | Maier |
| 5,277,015 | A | | 1/1994 | Brown et al. |

(Continued)

FOREIGN PATENT DOCUMENTS

| DE | 562704 C | 10/1932 |
| DE | 2644780 | 4/1978 |
| JP | 2000/271991 A | 3/1999 |
| WO | WO 2006/101631 A2 | 9/2006 |

OTHER PUBLICATIONS

PCT International Search Report with Written Opinion in corresponding Int'l appln. PCT/US2009/061860 dated Oct. 23, 2009.

(Continued)

*Primary Examiner* — Paul R Durand
*Assistant Examiner* — Andrew P Bainbridge
(74) *Attorney, Agent, or Firm* — Jay A Krebs

(57) ABSTRACT

Material dispensing systems and methods for make such systems are described. The material dispensing systems employ a collapsible container having at least two distinct chambers, and is at least partially surrounded by an elastically deformable band. The band stretches as the container is filled with a flowable composition, thereby creating potential energy which can then be used to dispense the composition in lieu of a propellant and/or pressurized container.

16 Claims, 15 Drawing Sheets

(56) References Cited

U.S. PATENT DOCUMENTS

| | | |
|---|---|---|
| 5,441,174 A | 8/1995 | Sperry |
| 5,850,908 A | 12/1998 | Jasek |
| 5,865,345 A * | 2/1999 | Cistone et al. ............... 222/94 |
| 5,895,029 A | 4/1999 | Lacout |
| 5,927,551 A | 7/1999 | Taylor et al. |
| 6,250,505 B1 | 6/2001 | Petit |
| 6,536,631 B1 | 3/2003 | Nickels et al. |
| 6,923,342 B2 * | 8/2005 | Bourque et al. ............ 222/136 |
| 7,204,950 B2 * | 4/2007 | Farha et al. ................ 264/447 |

OTHER PUBLICATIONS

U.S. Appl. No. 12/604,931, filed Oct. 23, 2009, John Geoffrey Chan, et al.

U.S. Appl. No. 12/604,965, filed Oct. 23, 2009, John Geoffrey Chan, et al.

U.S. Appl. No. 61/327,981, filed Apr. 26, 2010, John Geoffrey Chan, et al.

U.S. Appl. No. 61/327,994, filed Apr. 26, 2010, John Geoffrey Chan, et al.

U.S. Appl. No. 61/328,509, filed Apr. 27, 2010, David Matthew Groh.

* cited by examiner

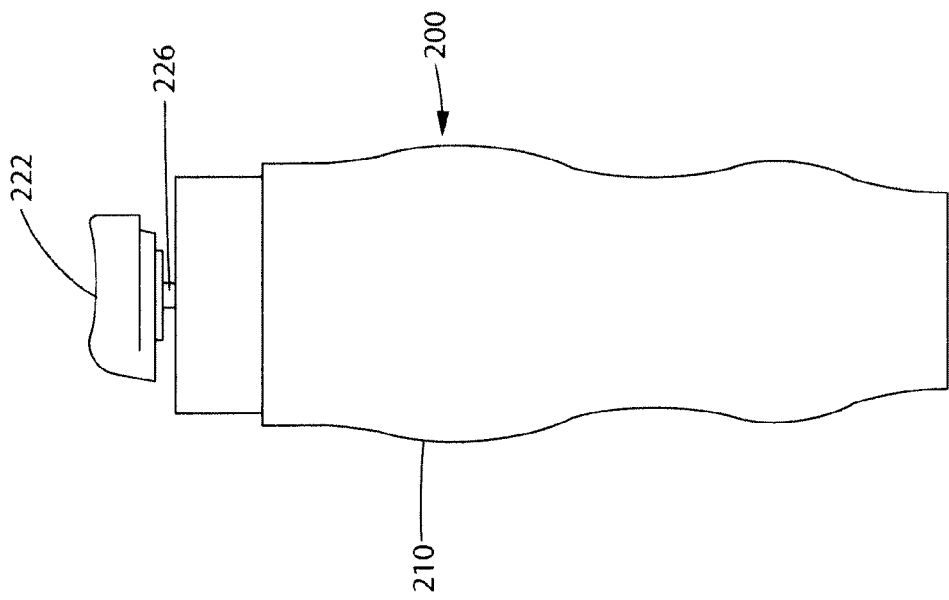
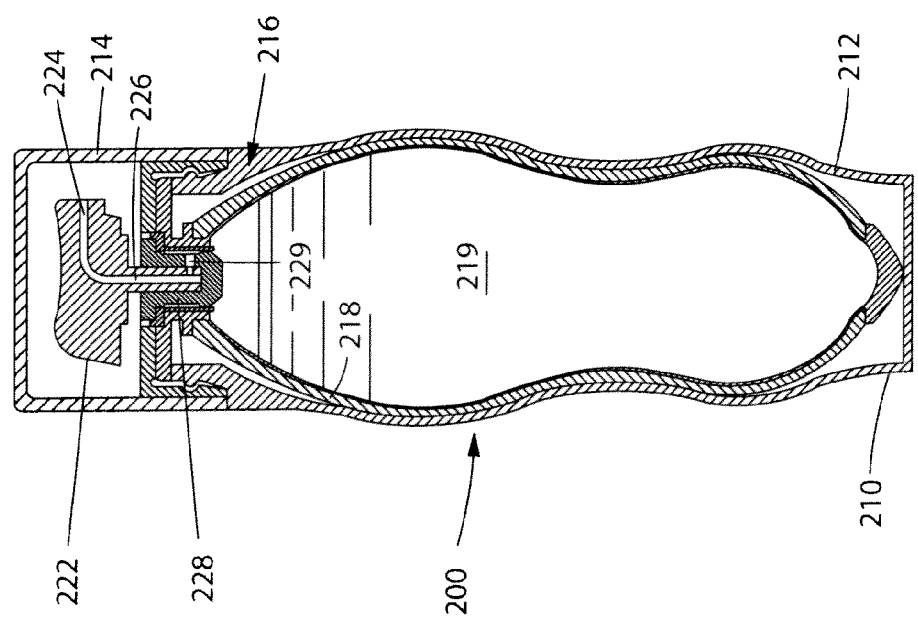
Fig. 15
Fig. 14

MULTI-CHAMBER MATERIAL DISPENSING SYSTEM AND METHOD FOR MAKING SAME

CROSS REFERENCE TO RELATED APPLICATION

This application claims priority under 35 U.S.C. §119(e) to U.S. Provisional Application Ser. No. 61/107,905, filed Oct. 23, 2008 to John Geoffrey Chan et al.

FIELD OF THE INVENTION

The present invention is directed to material dispensing systems and methods for making the same. A unique valve is also disclosed that can optionally be used in both the described methods and/or in the final material dispensing systems. The present invention is further directed to packages and personal care products that employ the material dispensing systems described herein.

BACKGROUND OF THE INVENTION

Aerosol delivery systems have been widely used for several decades to deliver a variety of consumer goods, including, for example, personal care items, paint, foods, and home care products. These systems utilize volatile propellants to push the product out of the aerosol containers. Aerosol technology has gained favor for being both effective and relatively inexpensive. The technology is not however without associated disadvantages. The release of traditionally used fluorocarbon and hydrocarbon type propellants into the atmospheres is one associated negative. Another disadvantage is that the aerosol containers are considered pressure vessels, which can necessitate extra safety equipment and procedures during its manufacture. The pressurized containers can also create concern for human injury if problems arise during storage, use, or disposal. And the high internal pressure accompanying many aerosol products has also limited the material and geometry options for the container.

Pump systems is one alternative to aerosols. Pump systems generally dispense a metered amount of a product. However consumers may have different requirements, and thus, difficulty arises in providing a proper metered amount that is satisfactory to all users. For example, one consumer may need to pump a dispenser two times to dispense their desired volume of product, and another consumer may only require one pump of the same dispenser. And if the desired volume is somewhere between pumps, the consumer may become frustrated in attempting to use the pump dispenser.

An approach has been developed to offer controlled dispensing similar to aerosols, but without many of the negatives associated with the same. This approach includes a collapsible container surrounded by an elastomeric band. A normally closed valve and an actuator assembly are affixed to the container. When the container is initially filled with product, it expands along with the surrounding elastomeric band. Potential energy is generated as the elastomeric band stretches. And when the actuator is operated to open the valve, the potential energy is converted to kinetic energy to dispense product out of the container until the actuator is disengaged. Examples of such a dispensing system are disclosed in U.S. Pat. Nos. 4,964,540 and 5,232,126. The predominant expansion and contraction of the elastomeric band in these systems is in the radial direction. As a result, a significant amount of product can be trapped in the closed end of the container, particularly where there are material property variances in the container and band, and where viscous products, such as, for example, gels are involved. Accordingly, there is room for improvement in the art.

SUMMARY OF THE INVENTION

The present invention is directed to methods of making material dispensing systems. In accordance with one exemplary embodiment, there has now been provided a method comprising the steps of: (a) providing a container preform comprising at least two distinct chambers, said container perform comprising a polymeric preform and an elastically deformable band surrounding at least a portion of the polymeric preform; (b) heating the polymeric preform; (c) positioning the container preform into a mold cavity; and (d) applying pressure to an interior of the polymeric preform sufficient to cause the container preform to expand outwardly towards a wall of the mold cavity to define a container, during which the elastically deformable band is stretched and potential energy is generated in association with the stretched elastically deformable band which at least partially collapses the container when the applied internal pressure is removed.

The present invention is also directed to material dispensing systems. The material dispensing systems may generally include a collapsible bag comprising at least two distinct chambers, and a band surrounding at least a portion of the bag. In one exemplary embodiment, the bag has a length that is at least about 50% longer than the length of the band. In another exemplary embodiment, the band is constructed of material that permits the transfer of invisible light waves through a wall of the band—this enables invisible light to pass through the band when situated around a bag preform to heat the preform prior to blowing the same into a final bag configuration. In yet another exemplary embodiment, the bag comprises at least one section (such as a side wall or the dividing wall) having a wall thickness less than about 4 mils, or less than about 2 mils, and can be as low as about 1 mil. In a further embodiment, the bag is made from an injection molding grade polyester having an intrinsic viscosity value of from about 0.5 to about 1.0, or about 0.58. In one preferred embodiment, the band is affixed to the bag; e.g., by chemical means, or via mechanical means beyond mere friction. Non-limiting examples of suitable ways to affix the band to the bag include using shrink sleeves or over-molding a retaining ring/band made out of composite materials to secure the elastically deformable band to the perform. The material dispensing system may be adapted to dispense multiple products by way of a multi-chambered bag.

Unfilled and filled packages are also provided by the present invention. The packages can include an outer container and a material dispensing system disposed therein. The outer container can employ various features. In one embodiment the outer container is selected from the group consisting of: a blow molded plastic container, an injection molded container, a glass container, a flexible packaging, a paper or cellulosic packaging; a rubber container, or a combination or mixture thereof. For example, the outer container may take on a variety of shapes and geometries that are not traditionally employed with aerosol products. The containers may have reduced diameter sections, have tapered sections, or be oval or square, for example. The outer containers may be transparent, translucent, or employ windows that permit a user to see how much product remains in the package (through changes to the appearance of the material dispensing system) to understand when replacement products should be purchased. For embodiments where one can see at least a portion of the material dispensing system, the material dispensing system may employ colors and/or indicia to communicate aspects of the product contained therein. In some embodiments, the outer container may not completely enclose the material dispensing system. That is, the outer container may form only parts of an outer covering for aesthetic and/or functional features, such as, for example, a base or legs for the material dispensing system, or a handle for the material dispensing system. The outer container may be rigid or may be flexible, or have portions having varying physical properties. The packages can be filled with numerous different flowable compositions; for example, personal care compositions, including, but not limited to shaving compositions, hair care compositions, antiperspirant/deodorant compositions, skin care formulations, and oral care compositions (including dentifrice and denture adhesives (see, e.g., U.S. Pat. Nos. 5,073,604 and 6,025,411)). Other flowable products may also be dispensed from the inventions herein. By way of example only, fabric/air care compositions, pet care compositions, and food products may be dispensed from the systems of the present invention.

These and other aspects of the present invention will be described in greater detail below.

BRIEF DESCRIPTION OF THE DRAWINGS

While the specification concludes with claims particularly pointing out and distinctly claiming the subject matter which is regarded as forming the present invention, it is believed that illustrative embodiments of the present invention may be better understood from the following description taken in conjunction with the accompanying drawings, in which:

FIG. 1A shows a container preform embodiment positioned within a blow molding mold; FIG. 1B shows the preform during the blow molding process; and FIG. 1C shows a blown container/bag surrounded by a stretched elastic band.

FIGS. 14 and 15 are respectively a cross-sectional view and side view of a packaged consumer product according to the present invention.

DETAILED DESCRIPTION OF THE INVENTION

The present invention may be understood more readily by reference to the following detailed description of illustrative and preferred embodiments. It is to be understood that the scope of the claims is not limited to the specific components, methods, conditions, devices, or parameters described herein, and that the terminology used herein is not intended to be limiting of the claimed invention. Also, as used in the specification, including the appended claims, the singular forms "a," "an," and "the" include the plural, and reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent basis "about," it will be understood that the particular values form another embodiment. All ranges are inclusive and combinable.

Figure 1A:
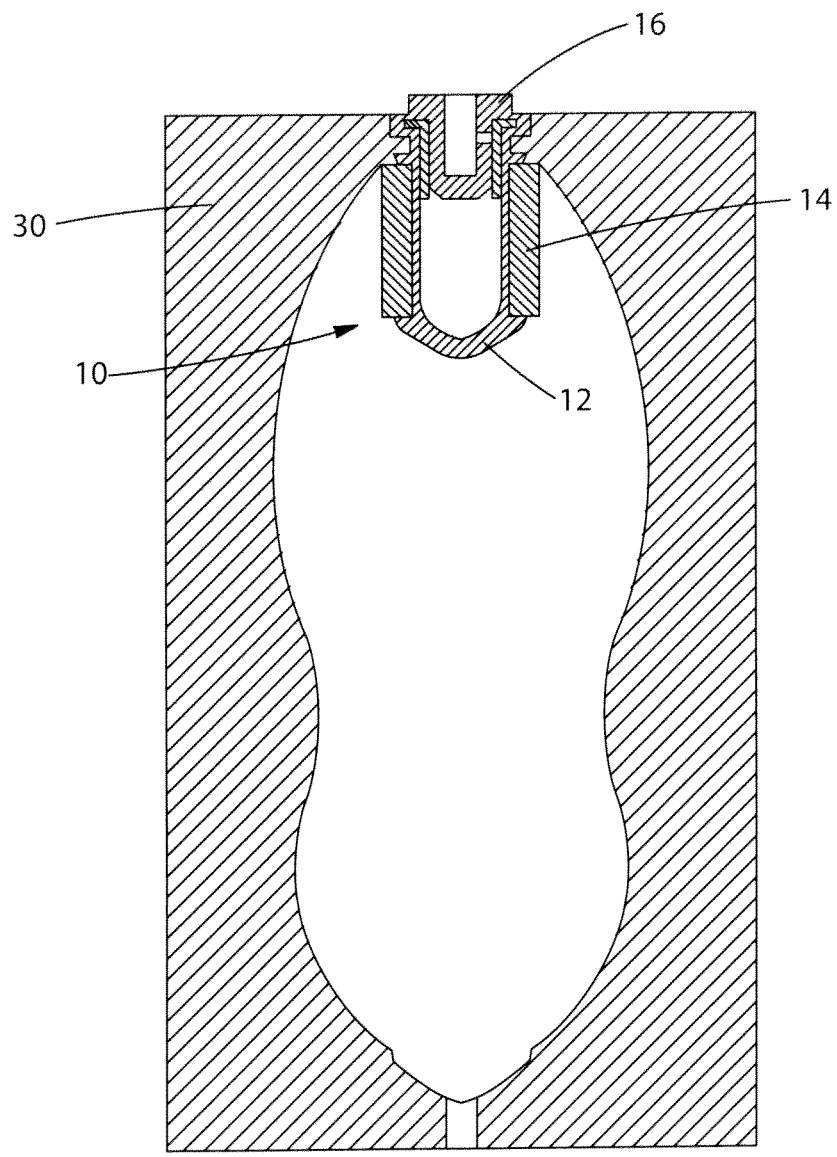
FIGS. 1A-1C are cross-sectional views illustrating an exemplary material dispensing system embodiment as it is being made.

In accordance with one aspect of the present invention, methods of making material dispensing systems are provided. An exemplary method will be described with reference to FIGS. 1A-1C. In FIG. 1A, an exemplary container preform 10 is shown inserted into a top portion of a blow molding mold 30. Container preform 10 includes a polymeric preform 12, an elastically deformable band 14, and a valve member 16. In one embodiment, the polymeric perform is made from injection molding grade PET by Eastman under trade name Eastar Copolyester EN058; polymeric materials having a broad molecular weight and 4.0 melt flow index; high density polyethelene under tradename M5040 by Lyondellbasell, and other materials such as Clarify PP 1903 by Lyondellbasell.

In one embodiment the elastically deformable band comprises a natural rubber materials such as latex. Suitable natural rubbers include those which have a Tensile Strength (psi) of about 3500 min. Additional suitable natural rubbers may have ultimate elongation of at least about 750%. Additionally the natural rubber may have a hardness (Shore A) of about 35+/−5 and a 100% Modulus (psi) of up to 125. Suitable natural rubbers may also have a specific gravity of up to about 0.97. In one embodiment the elastically deformable band comprises a natural rubber which can be made from rubber plant (e.g., Guayule shrub or Hevea tree). In one embodiment, the elastically deformable band is free or substantially free of carbon black or any other ingredients which would unduly obstruct or interfere with the transmittance of IR light to pass through the band. Without intending to be bound by theory, it is believed that by selecting an elastically deformable band which allows all or at least most of the IR light wave to pass through the elastically deformable band is preferably so the IR light can reach the preform and heat it.

Preform 12 is heated prior to stretching and/or blowing into a container/bag. The step of heating can be done by transmitting light waves through band 14 to preform 12. In one embodiment, at least a portion of the preform (preferably the entire perform) is heated to a to a temperature ranging from about 5 to about 30° F., or from about 10 to about 20° F. above the preform's (Tg) Glass Transition temperature. In another embodiment, the band is also heated to about the same temperature. The light waves are preferable invisible light waves, including, for example, in the infrared wavelength range, for example around about 1.5 micron. Pressure is applied to the interior of preform 12 to plastically expand preform 12 and elastically expand band 14. This pressure can be provided by a pressurized gas (e.g., air), a driven rod or other physical member, or a combination of both. In one embodiment, the applied pressure is from between about 30 psig to about 130 psig, alternatively at about 70 psig. Without intending to be bound by theory, it is believed that an applied pressure of within about ±15 or 10 psig of 70 psig is preferable for expending the perform quickly and evenly with low likelihood of undesirable damage to the perform. If physical pressure is employed, valve member 16 may not be disposed in the neck of the preform. In a preferred embodiment, valve member 16 is included in the preform so that the rate of gas entering the preform and the rate of gas exhausted from the formed container can be controlled.

Figure 1B:
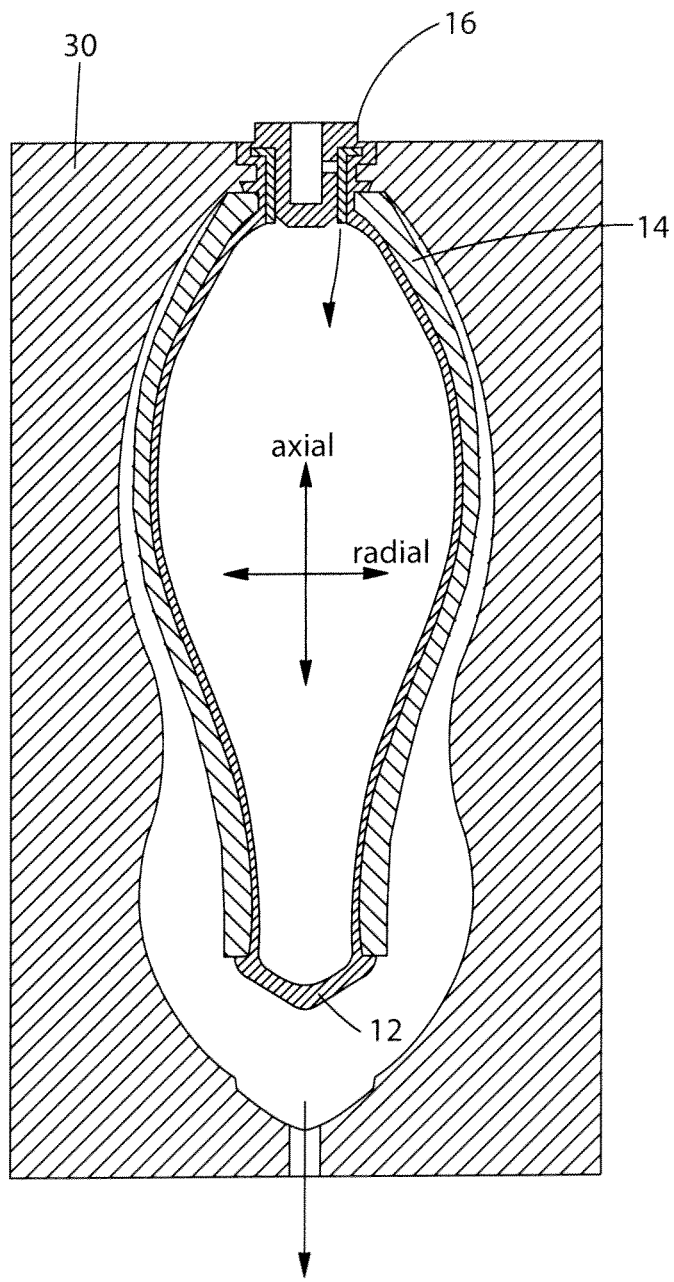
Figure 1C:
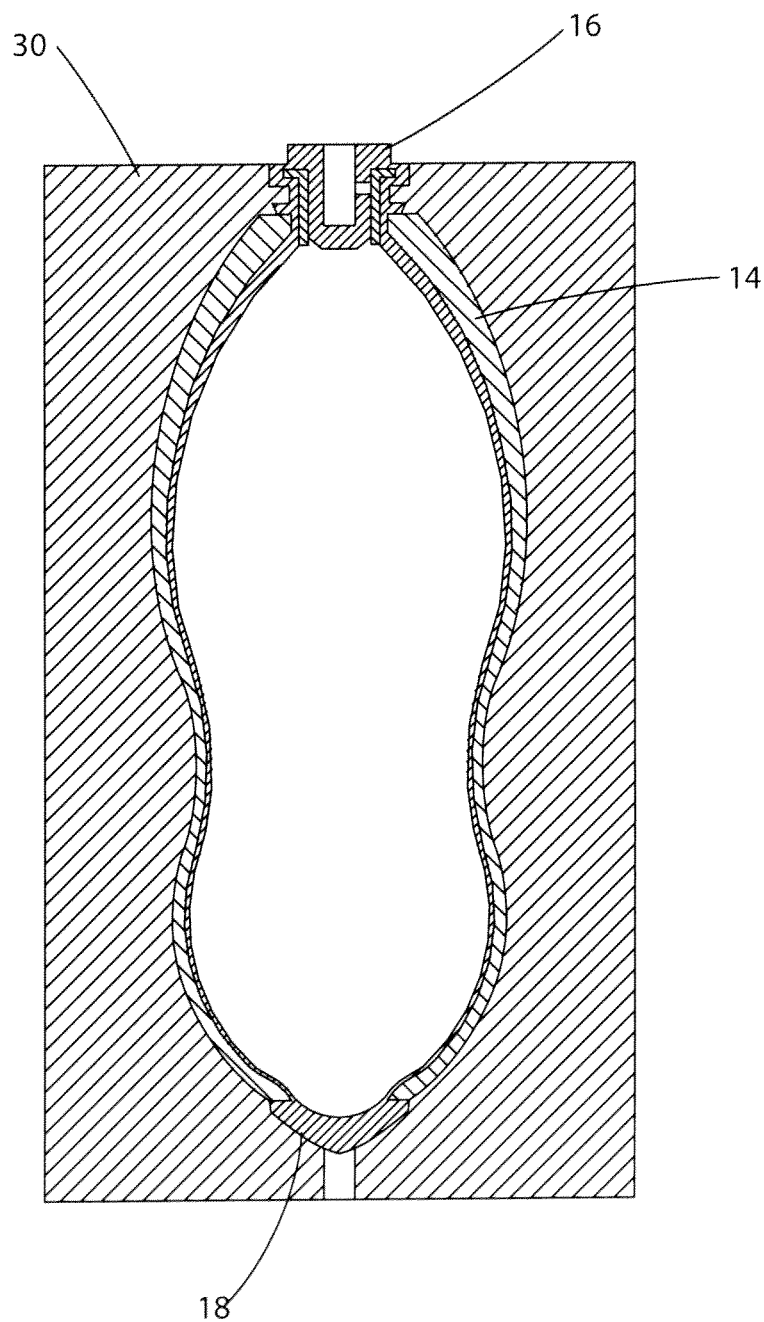

As is shown in FIG. 1B, preform 12 and band 14 are expanding in both an axial (lengthwise) direction and a radial direction. Preform 12 is being plastically deformed during this expansion, while band 14 is being elastically deformed or stretched such that potential energy is generated in association with band 14. In one embodiment, the potential energy generated is around 35 psig or less of hydrostatic pressure, or about 30 psig, or about 20 psig. In one embodiment, the band is stretched such that at least a portion of the band has a wall thickness ranging from about 6 mils to about 10 mils, preferably from about 7 to about 8 mils, preferably about 8.2 to about 8.4 mils. In one embodiment the at least a portion of the polymeric perform has a wall thickness of from about 1/16 inch to about 3/8 inch, alternatively about 1/8 inch before it is stretched. FIG. 1C shows preform 12 expanded outwardly and adjacent the walls of mold 30 to define a container or bag 18. If the internal pressure is released from container 18, the potential energy associated with band 14 will act on container 18 to at least partially collapse it, again, both in an axial direction and a radial direction.

The Background of the Invention section of this specification referenced known material dispensing systems that include a collapsible bag and an elastomeric band surrounding it. These prior systems are typically made in a much different manner than the methodology shown and described in connection with FIGS. 1A-1C. The prior bags are generally made using an injection stretch blow molding process wherein a preform is injection molded and then stretched and blown in a blow mold. Unlike exemplary methods of the present invention, the elastomeric band is not placed around the preform before and during the blow molding process. Instead, the preform is first blown into a bag and allowed to cure. The bag is removed from the mold, collapsed radially, and then inserted into the band via a separate process.

In one embodiment the collapsible bag can be made of any of the materials disclosed in U.S. Pat. No. 4,964,540 for making an "expandable bag"; as such, non-limiting examples of materials which can be used to make the bag include any material which is flexible and optionally elastic. In one embodiment, the material is substantially nonresilient material which is relatively inert so that it will not impart any taste or smell to its contents. Other materials such as polyethylene terephthalate, however can also be used. For example the bag may be made out of a plastic material such as nylon, polypropylene, polyester or SARANEX.

In another embodiment, the collapsible bag is a liner as shown and described in U.S. Pat. No. 5,232,126. Non-limiting examples of materials which can make up a liner suitable for use as the collapsible bag include any flexible plastic material, which may be either elastomeric or non-elastomeric, preferably non-elastomeric. A preferred material is high density polyethylene (HDPE); other suitable materials include polyamide and "Barex" 218, which is an acrylonitrile available from British Petroleum. The liner can be formed of two or more materials by co-extrusion blow molding if desired. It is not necessary or desirable to form any additional layers on the liner once it has been discharged from the mold. Liner is preferably flexible over its entire length, except that it is typically quite stiff at the neck of the liner which leads into the valve, but is stiff enough over its entire length to be self-supporting.

The liner may be of any suitable thickness. One embodiment allows the liner to have a thickness of from about 10 to 20 mils (0.010 to 0.020 inch) average sidewall thickness, preferably about 0.012 to 0.018 inch, over substantially its entire length except optionally at the neck which lead to the valve, the portion of the liner which forms the neck, which can be within 1 inch of the valve in a fully expanded state, may be slightly thicker. Minor variations in thickness at any given horizontal cross-sectional plane in the convoluted portion are acceptable.

In yet another embodiment, the collapsible bag is pleated with peaks and valleys as shown and described in U.S. Pat. Nos. 4,964,540 and 5,232,126. Other known collapsible or flexible bags suitable for use in a pressurized container can also be used.

Figure 2:
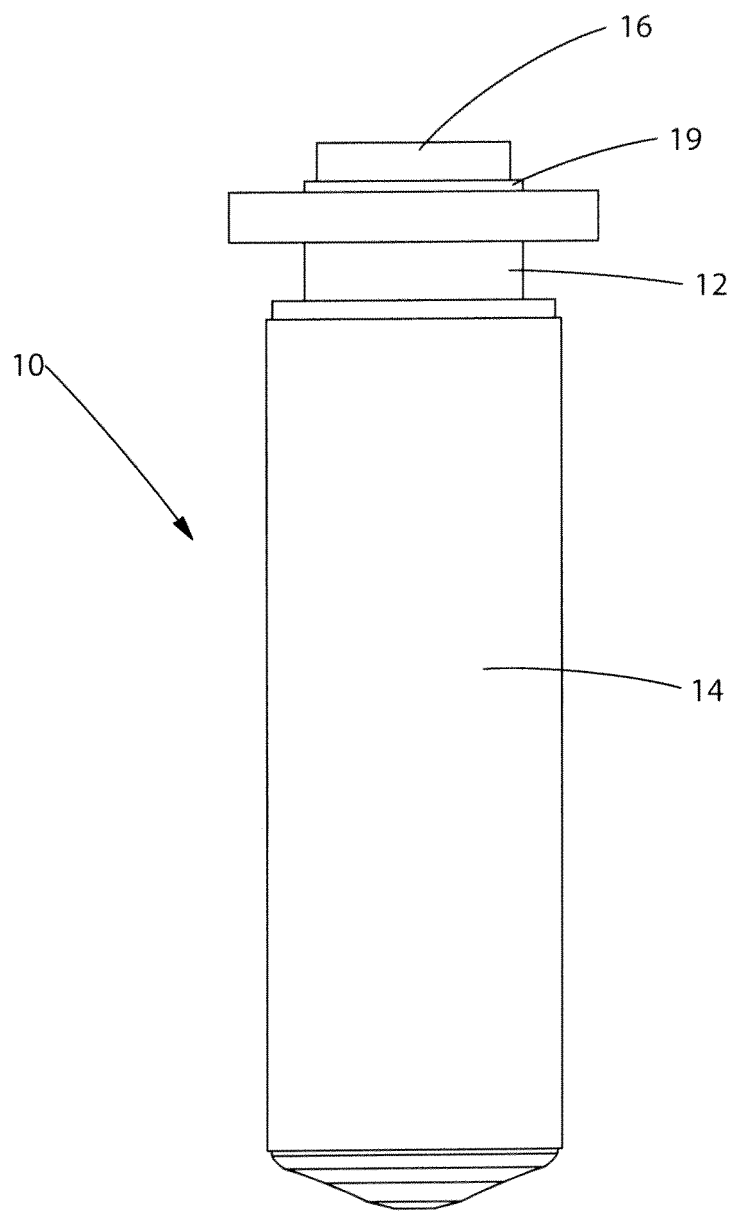
FIG. 2 is a side view of an exemplary container preform comprising a polymeric preform partially surrounded by an elastically deformable band.
Figure 3:
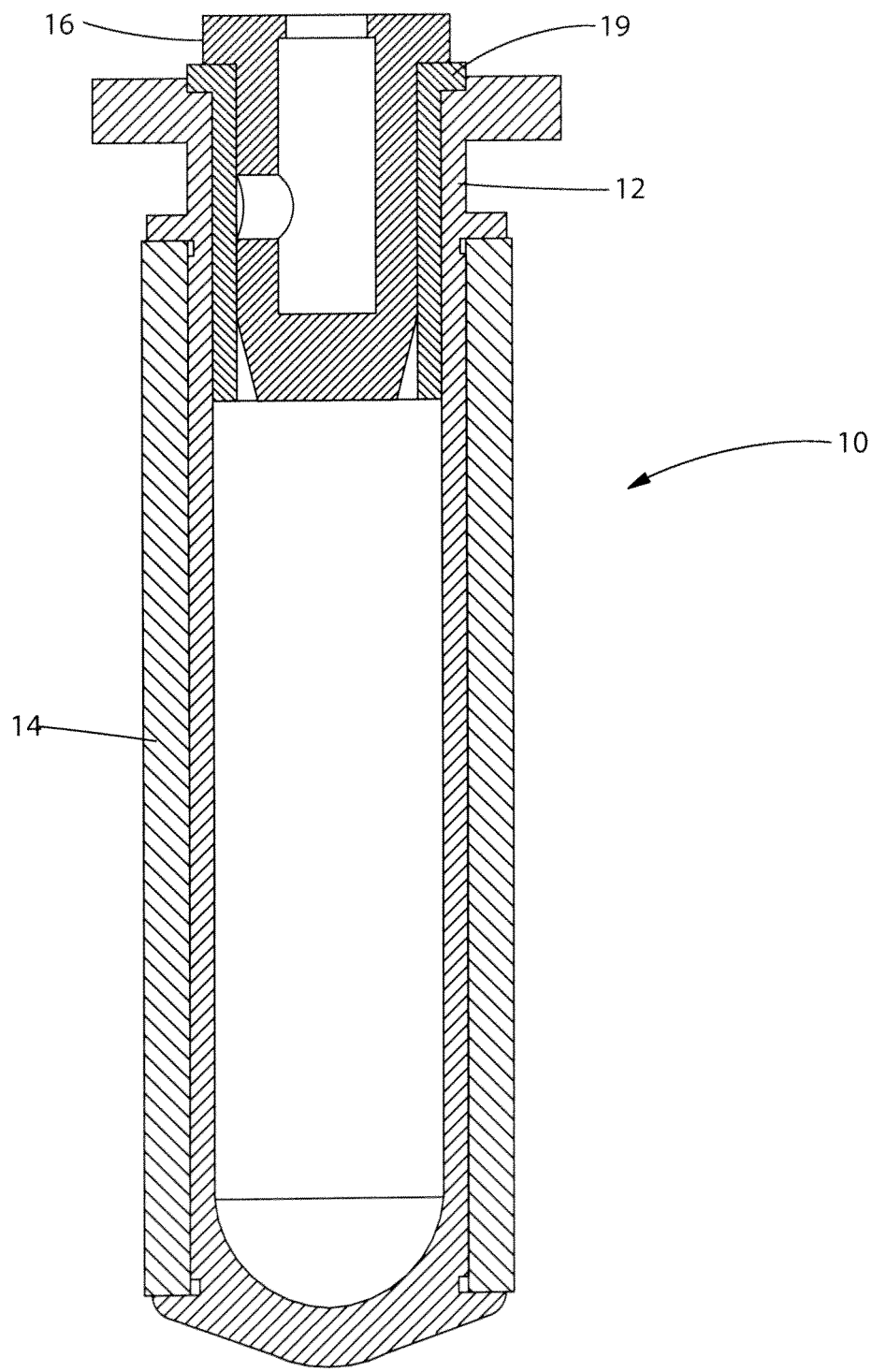
FIG. 3 is a cross-sectional view of the container preform shown in FIG. 2.

Referring to FIGS. 2 and 3, aspects of exemplary container preform 10 and its components will now be described. Container preform 10 is shown in FIG. 2, and includes polymeric preform 12, elastically deformable band 14, valve member 16, and an optional adapter/insert 19 disposed between valve member 16 and a neck region of preform 12.

Figure 4:
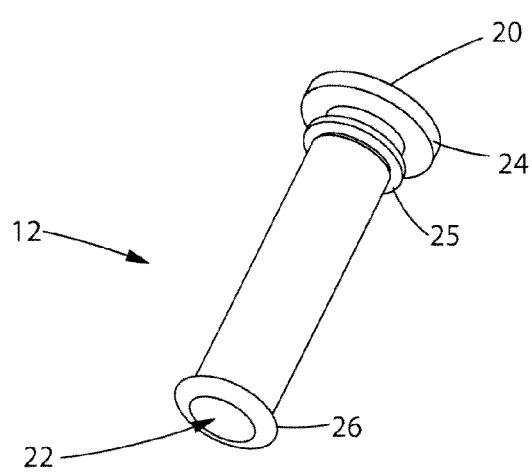
FIG. 4 is a perspective view of an exemplary polymeric preform.
Figure 5:
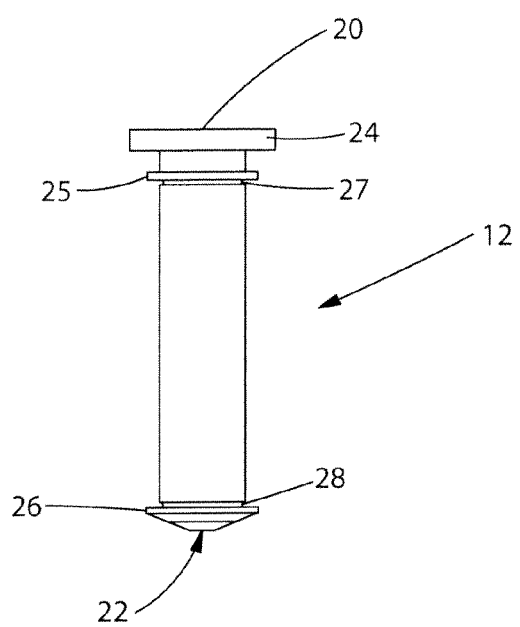
FIG. 5 is a side view of the polymeric preform shown in FIG. 4.

A perspective view and a side view of preform 12 are shown in FIGS. 4 and 5, respectively. Preform 12 has an open end 20 (although the actual opening is not shown) and an opposing closed end 22. In a preferred embodiment, and as shown in the figures, a flange 24 is defined proximate open end 20. Flange 24 can help in holding the preform in a blow mold. Flange 24 can also be used for joining the ultimately formed bag to an outer container and/or a portion of a valve or actuator assembly. Two additional flanges are employed on exemplary preform 12, a first flange 25 disposed proximate open end 20, and second flange 26 disposed proximate closed end 22. A pair of grooves 27 and 28 is also included on preform 12. The additional flanges and grooves are optional features which can help position and retain band 14. In a preferred embodiment, adhesive is placed in grooves 27 and 28 to affix band 14 to preform 12. Nonlimiting examples of suitable adhesives which can be used in accordance with the present invention include light cured adhesives such as: Loctite® 4306™ and 4307™, non-light activated adhesives such as Loctite® 406™ and 4501™, and mixtures thereof. Preform 12 can be formed from a variety of thermoplastic materials, including, for example, polyesters, nylons, polyolefins, and can be formed using any known techniques, such as injection molding. In one exemplary embodiment, the polymeric preform is made from an injection molding grade polyester material having an intrinsic viscosity value of from about 0.5 to about 1.0.

Figure 6:
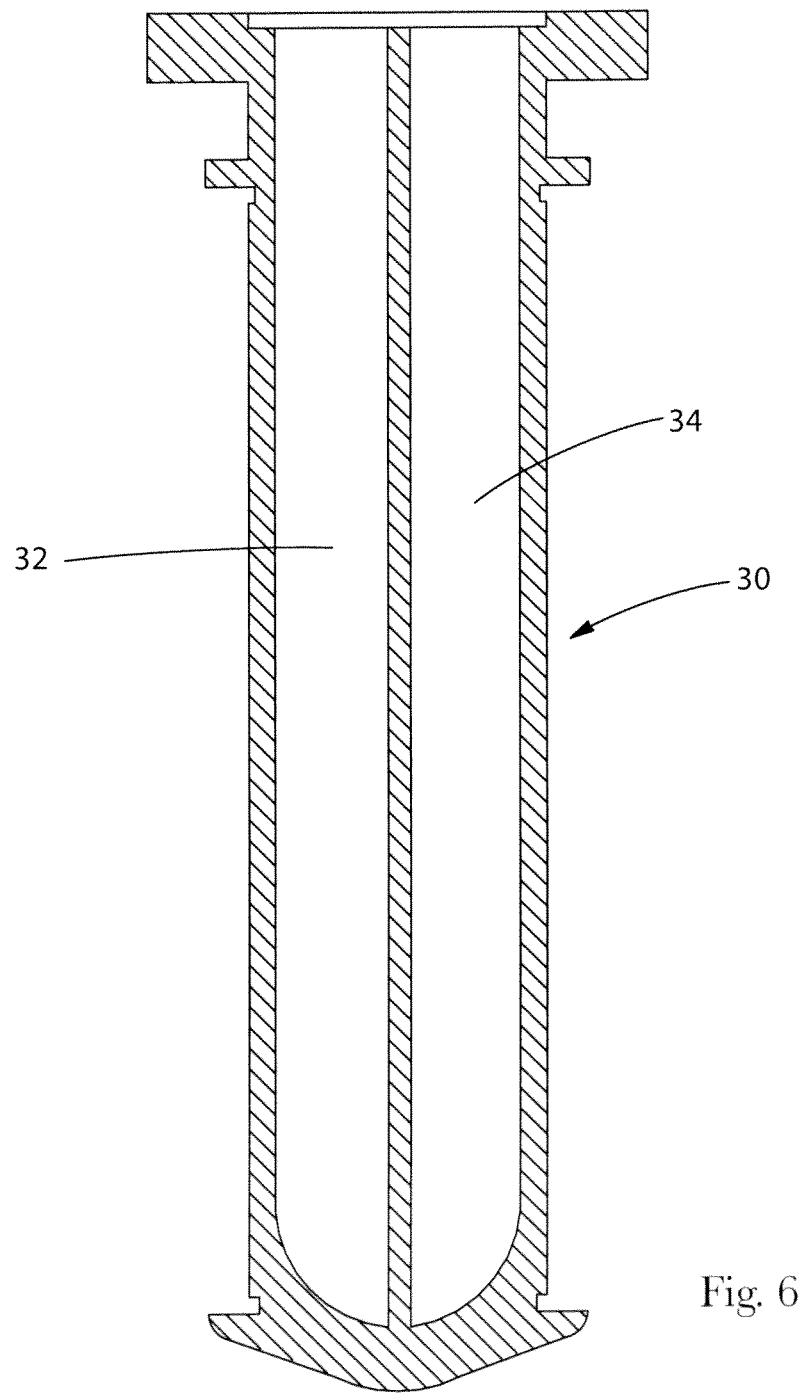
FIG. 6 is a cross-sectional view of another polymeric preform embodiment that contains separate and distinct chambers, which will be retained when the preform is formed into a container.

The polymeric preforms suitable for the present invention are not limited to the geometry shown in the included figures, and may employ similar or dissimilar features to those shown and described. A cross-sectional view of an alternative preform 30 in accordance with at least one embodiment of the present invention and having multiple chambers is illustrated in FIG. 6. Preform 30 has a first chamber 32 and a second distinct chamber 34. Additional embodiments where the perform has more than two distinct chambers is also within the scope of the present invention. The separate chambers are maintained during the stretching and/or blowing procedure so that the formed bag will also have at least two, such as three distinct chambers for holding different compositions or compositional components. The distinct chambers are separated by at least one dividing wall which is made of the same material as the rest of the polymeric perform. The dividing wall is preferably a single layer wall. The perform material (including any dividing wall) itself could be a multi-layer structure such as where formed by multi-layer injection molding process such as by Graham Packaging's SurShot™ multilayer injection technology (see e.g. EP 1147872, U.S. Pat. No. 6,787,094). In one embodiment, the perform includes a nylon layer and an ethylene vinyl alcohol (EVOH) layer sandwiched in between the PET perform material to improve barrier properties. The multiple distinct chambers reach from the open end of the polymeric perform to the closed end of the polymeric perform. Those of skill in the art will understand that the same or different compositions can be contained within each of said chambers. In one embodiment, two chemically incompatible ingredients can be separated into different chambers such that they are not in contact prior to dispensing. In another embodiment, two ingredients which can generate a third composition or benefit, such as heat or foam can be kept separate until the time of dispensing. The skilled artisan would readily appreciate that more than two separate chambers could also be employed.

The present invention has importantly found that when the perform (which is at least partially surrounded by the elastically deformable band) is filled thereby creating the resultant collapsible bag, a certain amount of internal pressure is generated within the collapsible bag. Where the perform comprises multiple chambers, such as two or three chambers, it has been found that the same amount of pressure can be generated within the multiple chambers. This is believed to be possible because the dividing wall defining the separate distinct chambers is flexible, collapsible and/or stretchable (being made of the same material as the collapsible bag), as the distinct chambers release composition—thereby reducing internal pressure, the dividing wall can flex so that the pressure across the multiple chambers remain the same. In one embodiment the pressure differential between the first distinct chamber and the second distinct chamber is less than about 15 psi, alternatively less than about 10 psi, alternatively less than about 5 psi, alternatively less than about 1 psi, or even about 0 psi.

In one embodiment, the first distinct chamber contains a first composition, and the second distinct chamber contains a second composition. In one embodiment, the first composition is not the same as the second composition. Examples of suitable compositions which can be used when the first composition and the second composition are not the same include any suitable compositions which may be incompatible when in contact with one anther. Additionally, the compositions separated into the first and the second chambers can made a self heating composition which can be suitable for various beauty care applications including but not limited to shave prep. One non-limiting example of a suitable self heating composition includes a composition which generates heat when in the presence of water. In one embodiment, the first composition comprises a reducing component such as an anhydrous ingredient. One example of a suitable anhydrous ingredient include zeolites and/or inorganic salts. When the reducing component is an anhydrous ingredient, the oxidizing component comprises a source of water. The contact between the anhydrous ingredient and water would then generate heat. Those of skill in the art will understand that reducing components, when put in contact with an oxidizing component will generate heat.

In one embodiment, the oxidizing component is provided in the second composition. Where the oxidizing component is provided in the second composition; heat could thereby be generated when the user dispenses the compositions dispensed from the first and second chambers and allows the compositions to come into contact with one another and ultimately mix. One example of an oxidizing component is a source of water. One example of a suitable combination of reducing components and oxidizing components are those described in U.S. PG Pub. 2004/0166085; 2006/0029566; and 2006/0029565. In such an embodiment, the oxidant component includes a first shave foam base and an oxidizing agent, and the reductant component includes a second shave foam base and a reducing agent. The shave foam bases each independently include an oil-in-water emulsion including water, a volatile foaming agent with a vapor pressure of about 40 psig or more at 21° C., and a water-dispersible surface active agent comprising a non-ionic surfactant. The amount and proportion of the oxidizing agent and the reducing agent are selected to provide an exothermic reaction with a desirable heat profile upon mixing of the oxidant component and the reductant component during use of the shave foam product. Preferably, at least one, or more preferably both, of the shave foam bases, are substantially free of soap and ionic surfactant (e.g., anionic surfactant). By "substantially free" is meant that the shave foam base contains less than about 2% of soap and ionic surfactant, preferably less than about 1.5% of soap and ionic surfactant, more preferably less than about 1% of soap and ionic surfactant, and most preferably 0% of soap and ionic surfactant.

The non-ionic, substantially soap-free formulation is compatible with, and stable in the presence of, the active agents that are used to generate the warm sensation. The non-ionic shave foam base may also offer additional advantages such as alleviating the problems associated with soap-based products. The non-ionic surfactant can include a blend of two surfactants, one of the surfactants being more hydrophobic than the other. Typically, the surfactant blend may include fatty alcohol ethoxylates having relatively longer and shorter polyethylene oxide chains (polyoxyethylene chains). For example, the blend may include a fatty alcohol ethoxylate having from 2 to 20 ethoxy groups, and a fatty alcohol ethoxylate having from 21 to 100 ethoxy groups, provided in a ratio in the range of from about 2.5:1 to about 1:2.5.

Preferably, the first shave foam base and the second shave foam base are substantially identical, by which is meant that each shave foam base has at least three, preferably at least four, more preferably at least five, ingredients identical to those in the other shave foam base and, most preferably, such ingredients are present in approximately the same proportions as in the other shave foam base.

Some implementations can exhibit one or more of the following advantages. The shave foam product has a relatively long shelf stability, preferably from about one year to about three years. In some embodiments, the shave foam product does not require shaking to produce a shave foam. In some implementations, the foaming agent and other ingredients of the shave foam product remain emulsified and stabilized during storage in the container, rather than phase-separating into a heterogeneous mixture. This can eliminate the need for shaking the shave foam products prior to use, which shaking could be disadvantageous in a two-component container. The shave foam product provides a pleasant, warm feeling to the user before and during shaving, in combination with the aesthetic properties of a foam. The heating effect of the shave foam helps to hydrate a user's hair (e.g., beard) and prepare the hair for shaving, improving user comfort. The shave foam product is shelf stable (e.g., their contents do not phase-separate in their containers), and dispenses from the container in an attractive, aesthetic form. After dispensing, the shave foam provides a smooth, creamy, stable lather that develops quickly when the foam is spread over the skin. After being applied to a user's skin (e.g., to the user's face), the lather remains on the skin during shaving (e.g., the lather does not run off of the face), even when the foam is heated by the exothermic reaction. The lather helps to soften hair (e.g., beard hair) and protects the skin during shaving. The lather remains creamy and stable when the shave foam composition is heated. The shave foam provides desirable performance properties such as lubricity and skin-friendliness, which are maintained during and after heating. The chemistry of the heating system that is used to heat the shave foam is safe for use on the skin and does not irritate the skin. After shaving, the lather can be relatively easily removed from the skin.

A more preferred shave foam base includes, in addition to the aforementioned ingredients, one or more (or, in a most preferred embodiment, all) of the following optional ingredients: a water-soluble polymer, a fatty alcohol, an amphoteric surfactant, an emollient (e.g., an oil), and a thickener. The shave foam base is typically in the form of an oil-in-water emulsion. The water-dispersible surface active agent, which is preferably a blend of surfactants, is selected to provide several functions. It functions as an emulsifier, solubilizer, detergent, and spreading or dispersing agent. The water-dispersible surface active agent includes a non-ionic surfactant, more preferably a blend of two or more non-ionic surfactants. Because they are stable in the presence of mild acids and alkalis, non-ionic surfactants can provide flexibility of formulation that is generally not possible using soaps. Preferred non-ionic surfactants include polyethoxylated fatty alcohol ethers.

Examples of suitable oxidizing agents for use in the oxidizing component include peroxides, such as hydrogen peroxide (typically added as a 35% solution), benzoylperoxide, peroxomonosulfate, peroxodisulfate, urea hydrogen peroxide, and t-butyl peroxide and mixtures thereof. In some embodiments, the oxidant component of a shave foam composition may include from about 2% to about 10% of an oxidizing agent. In certain embodiments, the oxidant component can include from about 12% to about 16% of an oxidizing agent, such as hydrogen peroxide (35%) (which corresponds to about 4% to about 6% $H_2O_2$ active).

Examples of suitable reducing agents for use in the reducing component are those that will react with the oxidizing agent when the two components of the formulation are mixed, to generate a perceptible exothermic reaction. Suitable reducing agents should also be safe for use on human skin in the amounts used in the formulation. The reducing agent may include, for example, thiosulfate and sulfite compounds, such as sodium sulfite, sodium thiosulfate (e.g., sodium thiosulfate pentahydrate), ammonium thiosulfate, potassium thiosulfate, thiourea and mixtures thereof. Other suitable reducing agents include compounds with a thiourea backbone, such as 1,5-diethyl-2-thiobarbituric acid or its derivatives, or ascorbic acid. Mixtures of the above reducing agents, and other suitable reducing agents, may also be used. In some embodiments, the reductant component of a shave foam composition may include from about 2% to about 10%, preferably from about 3% to about 8%, of a reducing agent.

The oxidizing agent and reducing agent are generally included in approximately stoichiometric proportions, based on the redox reaction that will occur. The predominant redox reaction of hydrogen peroxide with sodium thiosulfate is as follows:

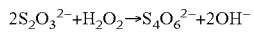

In the presence of an adequate amount of an effective catalyst, the reaction is as follows:

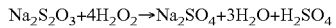

Preferably, the maximum temperature obtained by the shave foam during the reaction is from about 30° C. to about 60° C., and this temperature is reached from about 10 seconds to about 45 seconds after the two components are mixed (this is the temperature the shave foam reaches when the oxidant component and the reductant component of the shave foam are mixed in a beaker in stoichiometric amounts that provide a total weight of 10 grams of the shave foam; when atypical amount of from about 5 grams to about 8 grams of shave foam is applied to the skin, the actual temperature on the skin is typically from about 28° C. to about 45° C.). When the oxidizing agents and reducing agents described above are used, the shave foam composition generally includes from about 2% to about 10% of the oxidizing agent and from about 2% to about 10% of the reducing agent, in approximately stoichiometric proportions.

To obtain the heat profile described above, it may be advantageous to include a catalyst in the shave foam composition. The catalyst is selected to catalyze the exothermic reaction, without deleterious effects on the skin or on the properties of the shave foam. The catalyst is generally included in the reductant component of the shave foam composition. Suitable catalysts for the exothermic reaction described above include sodium molybdate (e.g., sodium molybdate dihydrate), potassium molybdate, ammonium molybdate, sodium tungstate, potassium tungstate, and mixtures thereof. The composition generally includes 0.1% to about 1.5%, preferably about 0.2% to about 1.0%, of the catalyst.

If the exothermic reaction generates an acid, as the reaction of the oxidizing and reducing agents discussed above will generally do, it is preferred that the composition (e.g., the reductant component) also include a neutralizing agent (a neutralizer). The neutralizing agent is selected and provided in a sufficient amount to neutralize enough of the acid so that exothermic reaction is complete and the shave foam composition will not irritate the user's skin. Preferably, substantially all of the acid is neutralized. Suitable neutralizing agents include, for example, triethanolamine, oxides (e.g., metal oxides), hydroxides (e.g., metal hydroxides), and metal carbonates, such as carbonates of alkaline metals (e.g., sodium, potassium), alkaline-earth metals (e.g., magnesium, barium), or transition metals (e.g., zinc). For example, the neutralizing agent may include calcium oxide, potassium hydroxide, sodium hydroxide, potassium bicarbonate, sodium bicarbonate or aluminum hydroxycarbonate. In some embodiments, the shave foam composition (preferably the reductant component of the shave foam composition) can include from about 0.5% to about 10% of such a neutralizer. For example, the reductant component can include about 1% calcium oxide or about 7% triethanolamine.

In another embodiment, the oxidizing component is not supplied in the second compartment, for example the oxidizing component can be a source of water such as water supplied by the user—for example water from the tap. One example where the oxidizing component is not included in any of the compositions contained within the material dispensing system is where the first composition comprises a zeolite in butylene glycol and the second composition comprises Polyethylene Glycol (such as PEG 8).

In yet another embodiment, the second chamber also comprises an reducing component which can be the same or different from the one in the first composition.

Additional examples of self heating compositions include those disclosed in U.S. Pat. Nos. 3,772,203; 4,439,416.

Without intending to be bound by theory, it has been found that the amount of each respective composition contained with said at least two distinct chambers is controlled not by the size of the chamber or the relative pressure within the chamber but by the size of the respective orifice formed within the valve leading away from the chamber out of the collapsible bag. In one embodiment, the valve comprises as many orifices as there are distinct chambers, wherein each chamber leads to its own orifice. In one embodiment, the orifices have the same cross sectional area. In another embodiment, the orifices have different cross sectional areas, where the larger area allows for a higher dispensing rate relative to the smaller area.

The compositions contained in the dispensing system can also include oral care or beauty care compositions. In one embodiment, the first or second composition comprises an aluminum salt and the other composition comprises a fluoride such as disclosed in U.S. Pat. No. 4,425,322. In another embodiment, the first chamber contains a composition comprising calcium peroxide and the second chamber contains a composition comprising sodium bicarbonate as disclosed in U.S. Pat. No. 5,599,525. In yet another embodiment, the first chamber contains a composition comprising a sculpting phase (comprising a gel forming matrix, a setting resin, a modifying agent, a solvent or carrier, and optionally at least one detactifying, glossing or lustering agent) and the second chamber contains a composition comprising a glossing phase (comprising a gel forming matrix, a film forming or modifying agent, a solvent or carrier, and at least one detactifying, glossing or lustering agent) as disclosed in U.S. Pat. No. 5,059,414 (See Claim 2). In yet another embodiment, the composition in the first chamber can comprises an anionic surfactant such as a detergent or soap, such as hair shampoo, and the composition in the second chamber can comprise a cationic surfactant such as a softener or conditioner such as hair conditioner.

In yet another embodiment, the compositions contained in the first and second chambers have different colors, or where one composition is colored and the non colored (clear or white). In yet another embodiment, the one composition is clear or translucent and the other composition is opaque. These embodiments may be especially desirable for certain consumers as they can provide a distinct, visual contrast between the compositions as they are dispensed allowing the user to understand that there are different ingredients in each composition which provide different benefits.

Referring again to FIGS. 2 and 3, band 14 is made from a material or blend of materials that can be elastically deformed (i.e., substantially non-permanently deformed), during which potential energy is generated. Band 14 is preferably made from an elastomeric material, such as, for example, a rubber material or Thermo plastic elastomer (TPE). The rubber material may be natural rubber, synthetic rubber, or a mixture thereof. In one exemplary embodiment, the elastically deformable band is made from a natural rubber that is non-opaque and that has an elasticity of 750% plus. The skilled artisan should appreciate that rubber materials having a lesser degree of elasticity may also be employed. As noted above, the polymeric preform is heated prior to being expanded into a container/bag. The surrounding band can be placed over the preform before, during, or after the preform is heated. If the band is disposed about the preform before heating, then it is preferred to employ a band material that permits the transfer therethrough of light waves so that the preform can be sufficiently heated via a heat source that is positioned on the outside of the preform/band assembly. Band materials that permit transfer of infrared light is one preferred material class. Without intending to be bound by theory, it is believed that opaque rubber materials may cause difficulties when heating the polymeric perform through the elastically deformable band. As such, it is preferably that the elastically deformable band has the desired elastic properties but still allow heating of the polymeric perform through the band.

Figure 7:
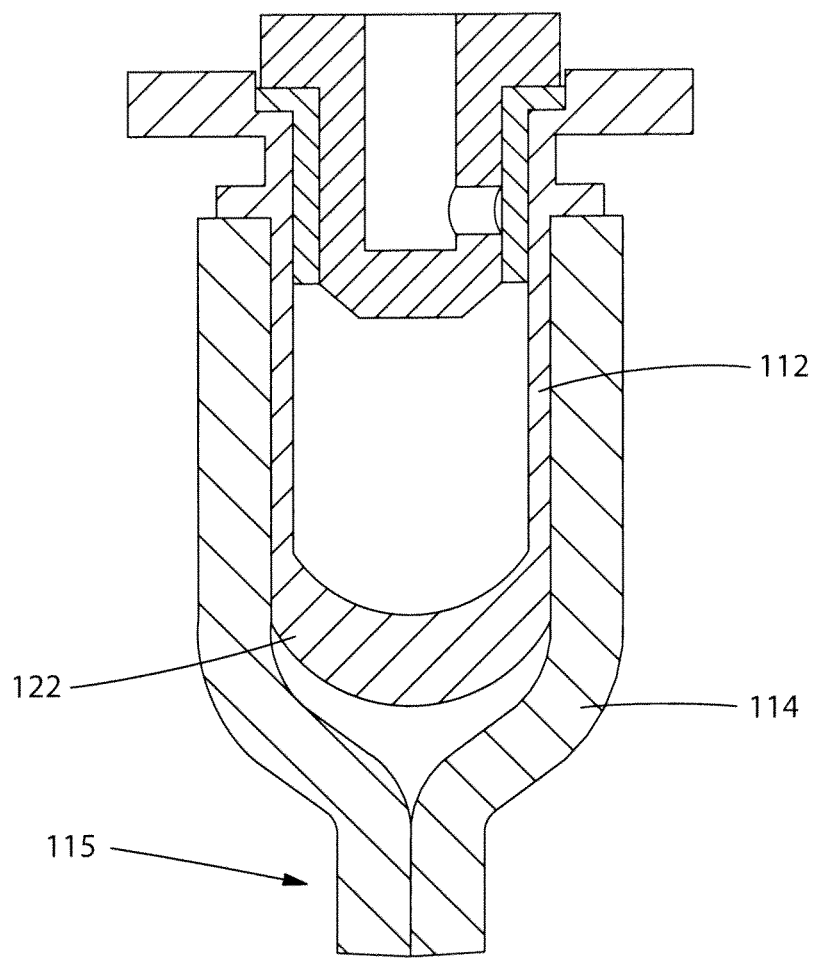
FIG. 7 a cross-sectional view of another container preform embodiment.

Band 14 can be permanently or removably affixed to preform 12 at points proximate the preform open end 20 and closed end 22. In one embodiment a portion of the band is permanently affixed to the perform. Optional grooves 27 and 28 are suitably configured for receiving adhesive; however, it should be noted that adhesive could also be simply deposited on the exterior of the preform in the absence of any specific receiving feature such as optional grooves 27 and 28. Suitable adhesives may include expoxies, urethanes, acrylates, and other adhesives that that can bond rubber or other elastically deformable material with plastic material can be used. Cyanoacrylate is one preferred adhesive material. The adhesives are typically air cured, light (visible/non-visible) cured, and/or cured via chemical cross-linking. In one exemplary embodiment, band 14 is not affixed to preform 12 at points that are spaced significantly apart from end 20 and closed end 22 so that the polymeric preform walls can flow and expand to the blow mold boundary as effectively and efficiently possible without being constrained by band 14. Mechanical means may also be employed to affix band 14 to preform 12. The band may be configured such that it is unnecessary to affix the distal portion of the band to the preform. For example, and as shown in FIG. 7, a band 114 can have a distal end 115 that is closed over the closed end 122 of a polymeric preform 112, whereby when the perform expands longitudinally during blow molding, band 114 can correspondingly stretch longitudinally. A closed distal end can be made, for example, by adhesively adhering inner wall portions to each other. A restraining member (e.g., a clamp) could also be placed around the exterior of the distal end to hold it closed. Although distal end 115 is shown completely closed, it could also be partially closed or be manufactured to have a smaller opening than its opposing side so that the preform and bag blow from the preform do not push through the band's distal end.

As noted above, valve member 16 is preferably included in the preform during the blow molding/stretching of the preform into a final bag. This preferred arrangement however does not preclude the absence of a valve in the manufacturing methods provided herein. A valve can help regulate the air pressure and/or provide a damping effect to ease the sudden increase of air pressure as it enters the preform. This air flow control idea can be reapplied to conventional blow molding process to achieve forming bottle/bag of 4 mils or less (even as low as about 1 to about 2 mils) wall thickness at the vital contour area. This air flow control idea can be carry out by means of programming the pre-blow and/or the final-blow of air flow rate into the preform, or via attaching a valve that will performance similar function to the blow molding air supply nozzle. The valve can also completely stop the flow of air from leaving the blown container and/or help decrease the exhaust rate of internal pressure once a bag is blown from the prefom. A significant amount of potential energy is generated with the band while the bag is formed which can collapse the recently formed bag very quickly if there is no regulation on the internal pressure exhaustion. Applicant has discovered that a rapid exhaustion of internal air pressure which lead to a contraction of the outer band that rapidly collapse the inner bag immediately after blow molding process or before the bag material is sufficiently cure or cool down can potentially create defects in the bag or weaken the fixment points on the preform where the adhesive is anchoring to, when they exist, between the outer band and the bag. Peripheral manufacturing equipment, including valves, which are not associated with the bag/band assembly could also be employed to help regulate internal pressure exhaustion and bag collapse rates. An inserted valve can also maintain the internal air pressure after the bag is molded so that leak tests can be performed between molding and filling with a dispensable product. A valve that is inserted into the preform during the blow molding process may be the same or different than that used in the final product. If a single valve is used, it can be employed to help in the molding process, for filling the bag with a dispensable product, and for controlling dispensing by the end user.

Figure 8:
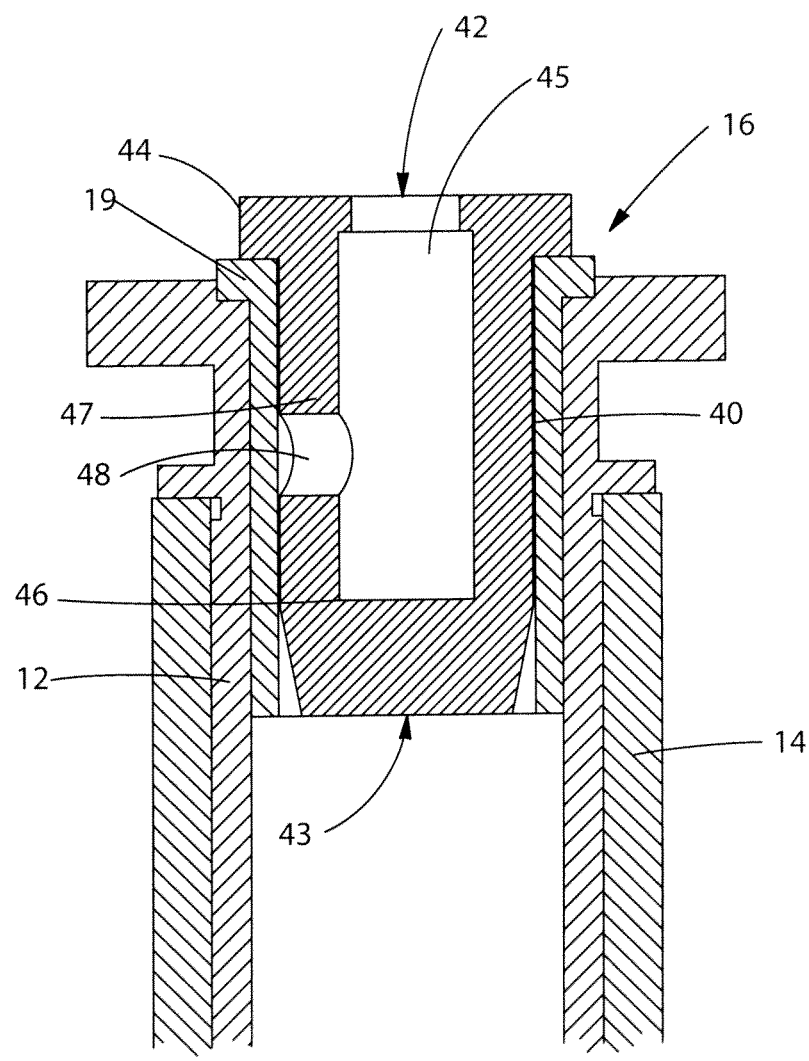
FIG. 8 is a partial cross-sectional view of a container preform embodiment that includes a valve member inserted into an opening of the preform.
Figure 9:
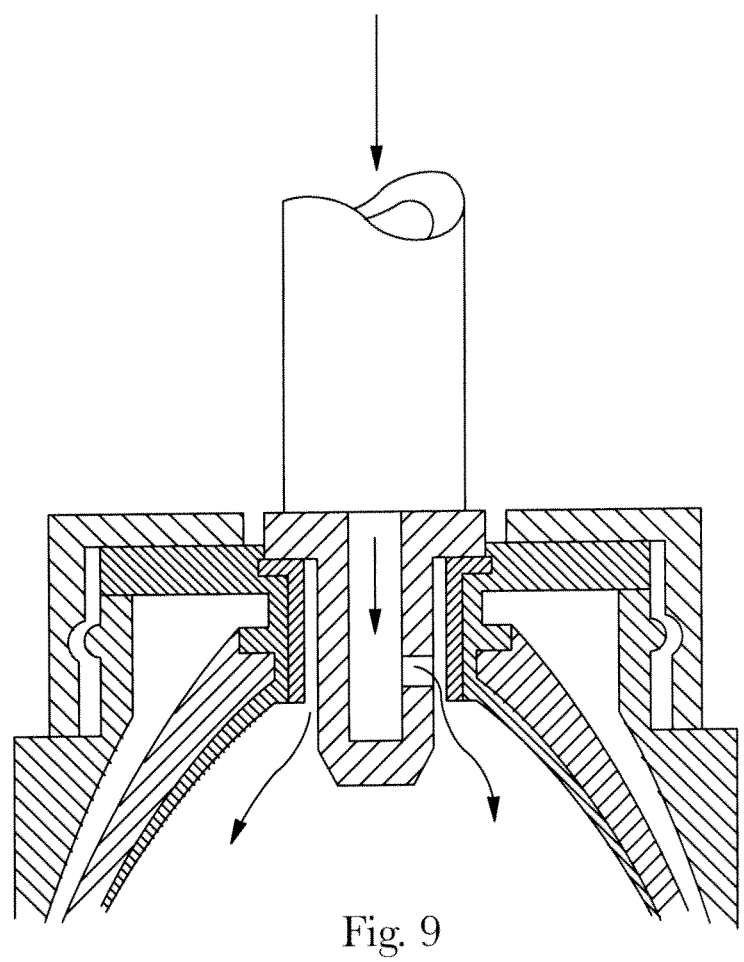
FIG. 9 is a partial cross-sectional view of a package according to the present invention as it is being filled with a flowable composition.
Figure 10B:
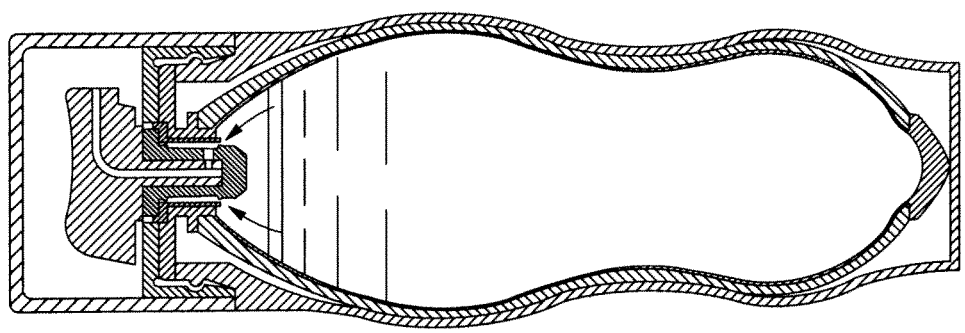
FIGS. 10A and 10B are cross-sectional views of a filled package, both prior to use and during use.
Figure 10A:
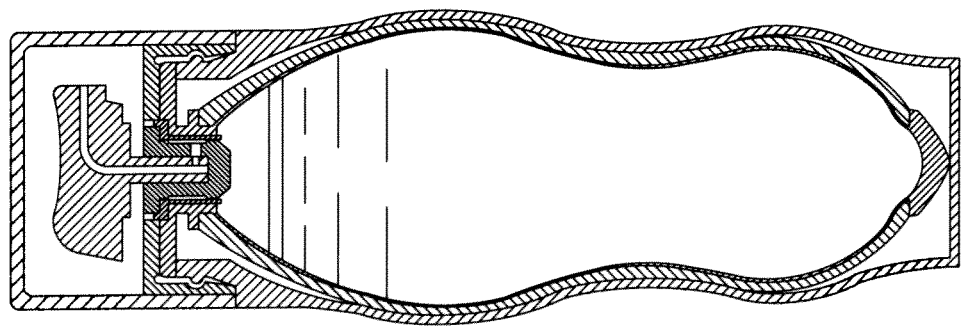

Valve member 16 represents one exemplary embodiment that can be employed in products, systems, and methods of the present invention. With reference to FIG. 8, exemplary valve member 16 includes an elastically deformable body 40 in cooperation with insert 19. An insert/adapter is not a necessary component—an inner wall of the preform or the finished bag neck can serve the same function as insert 19 in the operation of the exemplary valve. Insert 19 or alternatively a neck region of a blown bag/container) serves as a sleeve to seal valve 16 in its normally closed position. The elastically deformable body can be made from an elastomeric material, such as, for example, a rubber material. Other materials known to the skilled artisan can also be employed. Valve body 40 includes an open end 42, an opposing closed end 43, and a flange 44 disposed proximate open end 42. A blind hole 45 extends from open end 42 and terminates at a blind hole bottom 46. Blind hole 45 defines a valve body side wall 47. A through hole 48 extends through side wall 47 and is positioned between open end 42 and bottom 46 of the blind hole. When there is little to no stress applied to valve body 40, both the body exterior and through hole 48 or only the body exterior below the through hole 48 are sealed against an outer sleeve which can be defined by an insert/adapter (e.g., insert 19), a preform/bag neck region, or other component or portion thereof. The outer sleeve accordingly is typically made from a rigid material such as, for example, plastic, metal, hard elastomers, glass and cardboard or other cellulosic based materials. Applying a sufficient level of axial stress will cause elastically deformable body 40 to elongate in the axial direction, resulting in a reduction in the diameter of body 40. A fluid flow channel is created between the exterior surface of body 40 and the surrounding sleeve as body 40 elongates and reduces in diameter. The channel, once created, is in fluid communication with the interior of the preform or bag, through hole 48, and blind hole 45 and its open end 42. The fluid channel accordingly permits flowable material to travel into and out of the interior of the preform or bag/container created from the preform. During a blow molding process, the axial stress comes from pressurized air directed into blind hole 45. The axial stress can also be created by charging a pressurized product into the interior of the formed bag during a filling process (see, e.g., FIG. 9). And the axial stress can be created by downward displacement of a tube inserted into blind hole 45 that makes up part of a valve and actuator system (see, e.g., FIGS. 10A and 10B).

Figure 11:
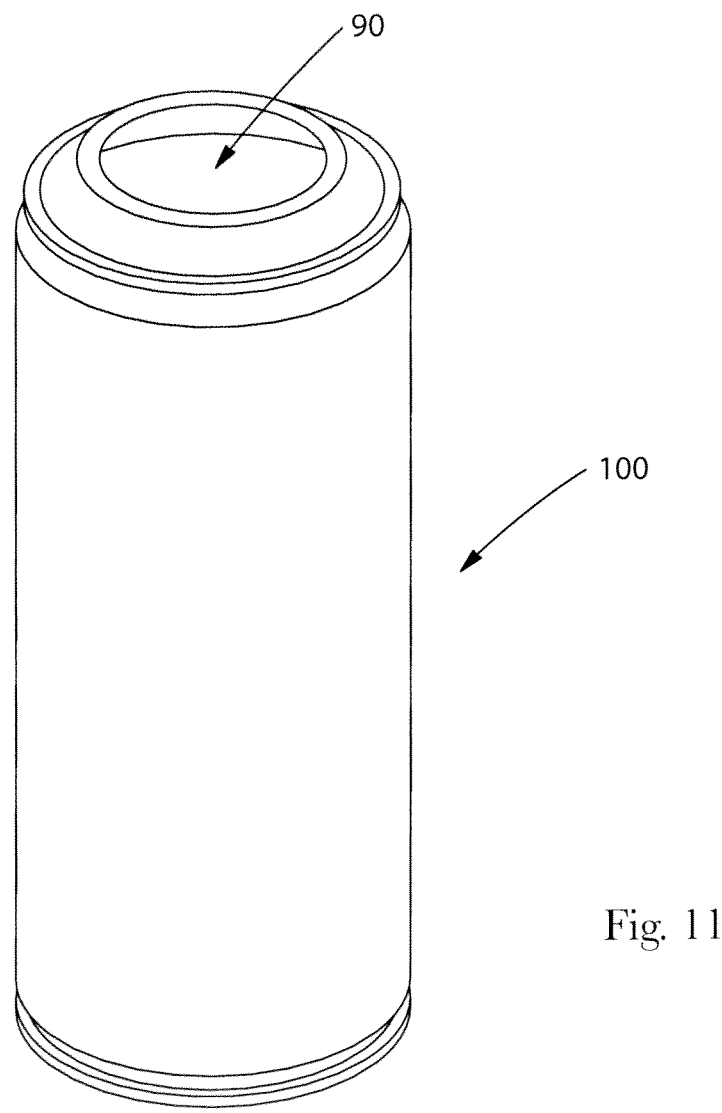
FIG. 11 is a perspective view of a can that is capable of receiving material dispensing systems of the present invention.

Referring back to FIGS. 1A-1C, a polymeric preform and elastically deformable band are heated and placed into a blow mold wherein the preform is plastically expanded into a collapsible container/bag and the band is elastically expanded due to the internal pressure generated during the blow molding process. Potential energy is created while the band elastically expands. And this potential energy can collapse the collapsible bag as the internal pressure is exhausted. The collapsed bag and surrounding band are now sized and configured for inserting into the top opening 90 of an exemplary can 100 as shown in FIG. 11, or bottle or other outer packaging container. The top of the bag can employ features that facilitate attachment to the outer packaging container. A flowable product can be charged into the collapsed bag. During such a filling process, the bag expands both radially and axially, which, in turn, causes the elastically deformable band to correspondingly expand both radially and axially. Potential energy is once again created as the elastically deformable band expands. A normally-closed valve is fluidly connected with the filled bag and band assembly. The closed valve prevents the band potential energy from acting on the filled bag to urge the contents through the valve. The valve can be opened with an activation of an actuator, for example.

Figure 12:
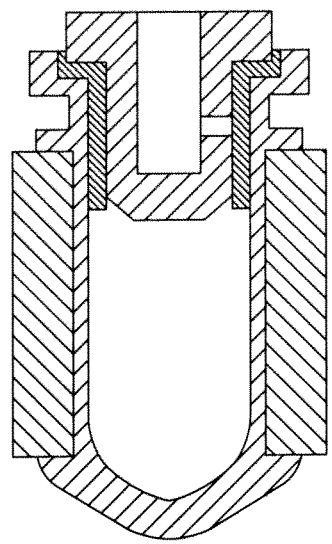
FIGS. 12 and 13 illustrate exemplary dimensional changes that can occur after transitioning a container preform into a container/material dispensing system.
Figure 13:
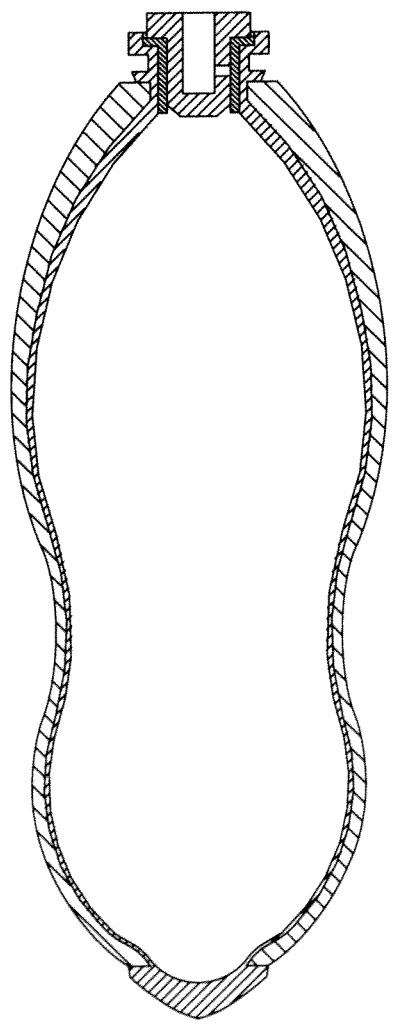

Known material dispensing systems that utilize a collapsible bag and elastic band system make the collapsible bag to its final length and then insert the bag in a collapsed state into an elastic band. The elastic band, in its unstretched state, typically has a length such that it covers a majority of the bag's final length, resulting in a majority of the band expansion and contraction to be in the radial direction. This approach can lead to a significant amount of product being trapped in the bottom portion of the bag as it contracts during use. In contrast, the present invention provides systems that expand and contract a significant amount in both a radial direction and an axial (or lengthwise) direction. The band, in some preferred embodiments, accordingly stretches axially or lengthwise at least about 50%, 100%, 150%, or 200% of its initial unstretched length. FIGS. 12 and 13 illustrate, by way of example, the difference in size of band 14 in an unstrained/unstretched state as compared to a stretched state. Similarly, during use, the band shrinks or contracts in an axial direction at least about 50%, 100%, 150%, or 200% from an initial dispensing at first use to a final, complete dispensing wherein no further product flows out of the material dispensing system upon opening a normally-closed valve. And because of this significant axial expansion and contraction, the length of the collapsible bag can be significantly greater than the length of the energy band in its unstrained/unstretched state. For example, the collapsible bag can be at least about 100%, 150%, 200%, or 300% of the length of the associated and unstrained energy band.

One way of providing significant axial expansion and contraction of the energy band is by making the collapsible bag and energy band assembly as shown in described in connection with FIGS. 1A-1C. That is, place an energy band around an injection molded preform and form a bag using a blow molding process wherein the energy band expands and stretches significantly lengthwise as the bag is formed. Another manufacturing technique that may be used to provide increased axial expansion (during filling) and contraction (upon dispensing product) includes manipulating a preformed bag to a shorter length than its fully extended length, and then inserting the manipulated bag into an energy band that is at least about 50% or 100% shorter than the bag's fully extended length. The energy band can either be affixed to a bottom portion of the bag or configured to prevent the bag from simply extending out of an end of the band, so that as the bag expands during filling it stretches the band lengthwise. As such, in one embodiment the method of making the material dispensing system of the present invention further comprises a step of manipulating the polymeric perform to take on a length that is shorter than the axially extended length selected from the group consisting of: affixing a bottom portion of the polymeric perform to the bottom end of the elastically deformable band; at least partially sealing the bottom end of the elastically deformable band such that the polymeric perform does not extend beyond the at least partially sealed end of the elastically deformable band; and a combination thereof. The bag can be manipulated in various ways, including, for example, by folding the bag's closed end towards the bag's open end, or by inverting the bag's closed end.

FIGS. 1A-1C illustrate an exemplary method for making a material dispensing system. The resulting system can be placed into a separately manufactured outer container, such as described in the above summary, non-limiting examples of suitable outer containers include a bottle or can. The outer container can however be made simultaneously with the material dispensing system in accordance with another exemplary method provided by the present invention. In this method, a package preform having an inner container preform, an outer container preform, and an elastically deformable member disposed between the two preforms is used in a blow molding process. All three structures expand to the mold cavity wall with use of pressurized air and/or a push rod. In one embodiment, where a push rod is used in an Injection Stress Blow Molding (ISBM) process, the valve is installed after the ISBM process. Installing the valve after the ISBM method allows the push rod to push through the preform open end 20. Upon exhausting the internal pressure, the elastically deformable member contracts and collapses an inner container formed from its respective preform, while an outer container formed from its respective preform substantially maintains the geometry defined by the blow mold cavity with the help of an opening or a gap between the outer container and the elastically deformable member to break the negative pressure. The inner and outer container preforms may be made from the same polymeric material or different materials (e.g., having different thermo transition temperature such as Melt temperatures or Glass Transition temperature).

Figure 16A:
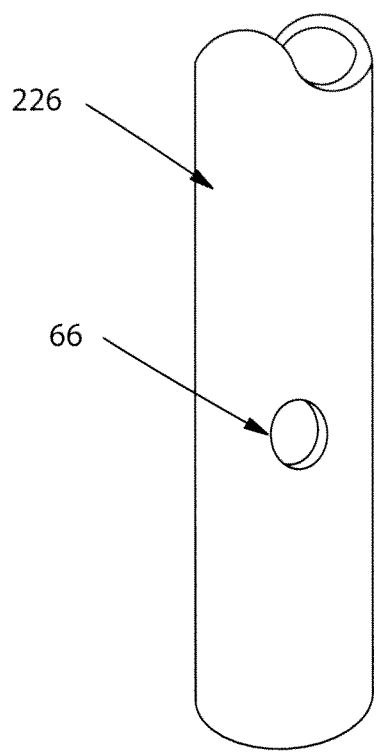
FIGS. 16A and 16B are exemplary side views of two tubes, each in accordance with at least one embodiment of the present invention.
Figure 16B:
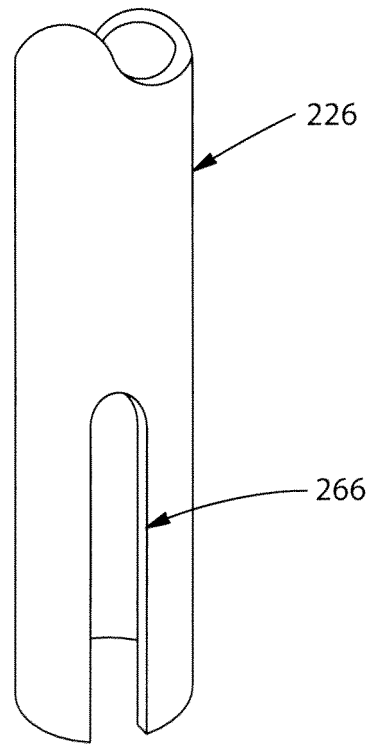

An exemplary personal care product 200 is shown in FIGS. 14 and 15. The product includes an outer package 210 defined by a shaped container 212 and overcap 214. A material dispensing system 216 is disposed within container 212, which includes a bag 218 filled with a flowable composition 219 and a stretched band 220 surrounding bag 218. An actuator 222 is positioned on container 212 and includes a flow path 224 defined partially by a tube 226. Tube 226 is connected to an elastically deformable valve member 228. Downward displacement of tube 226 elongates valve member 228 sufficiently to allow a volume of composition 219 to travel into a valve member through hole 229 which is aligned with a through hole or an open ended slot (FIG. 6A showing a through hole 66 on tube 226 and FIG. 16B showing an open ended slot 266 on another tube 226) in tube 226 such that the composition continues traveling up tube 226 and flow path 224 to exit package 210. In one exemplary embodiment, tube 226 is rotatable within valve member 228 such that in one position the tube's through hole is aligned with through hole 229 and in another position it is not. This feature provides a locking aspect to prevent or limit the discharge of composition 219 if the actuator is inadvertently hit or pressed.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A material dispensing system, comprising:
   a. a collapsible bag comprising at least two distinct compartments separated by a dividing wall made of the same material as the rest of the collapsible bag;
   b. an elastically deformable band surrounding at least a portion of the bag, wherein the elastically deformable band is constructed of material that permits the transfer of invisible and/or infrared light waves through a wall of the elastically deformable band and
   c. an outer container, wherein the material dispensing system is disposed in the outer container, wherein the outer container comprises a polymeric material, and wherein the outer container comprises an open end, an opposing closed end, and a reduced diameter region disposed between the open end and the closed end.

2. The material dispensing system of claim 1, wherein the dividing wall has more than one layer.

3. The material dispensing system of claim 1, wherein the collapsible bag comprises at least one section having a wall thickness less than about 4 mils.

4. The material dispensing system of claim 1, wherein the dividing wall has a wall thickness less than about 4 mils.

5. The material dispensing system of claim 1, wherein the collapsible bag comprises an injection molding grade polyester having an intrinsic viscosity value of from 0.5 to about 1.0.

6. The material dispensing system of claim 1, wherein the collapsible bag has an open end and a closed end opposite said open end, and the elastically deformable band comprises a first end proximate the bag open end and a second end proximate to the bag closed end.

7. The material dispensing system of claim 6, wherein the elastically deformable band is affixed to the collapsible bag by at least one of chemical adhesive, mechanical means beyond mere friction, or a combination thereof.

8. The material dispensing system of claim 1, wherein the elastically deformable bag comprises a rubber material.

9. The material dispensing system of claim 1, whereupon removing the collapsible bag from the elastically deformable band and the elastically deformable band being in an unstrained state, the extended length of the collapsible bag is at least about 100% longer than the length of the elastically deformable band.

10. The material dispensing system of claim 1, wherein the first chamber comprises a reducing component.

11. The material dispensing system of claim 10, wherein the reducing component comprises at least one of an anhydrous ingredient, a thiosulfate, a sulfite compounds and a mixture thereof.

12. The material dispensing system of claim 10, wherein the second chamber comprises an oxidizing component.

13. The material dispensing system of claim 12, wherein oxidizing component comprises at least one of a source of water, a peroxide and a mixture thereof.

14. The material dispensing system of claim 1, further comprising a valve connected to the collapsible bag, said valve forming a first orifice connected to a first distinct chamber and a second orifice connected to a second distinct chamber.

15. The material dispensing system of claim 14, wherein the first orifice does not have the same cross sectional area as the second orifice.

16. A personal care product, comprising:
   a. an outer container comprising a polymeric material, and wherein the outer container comprises an open end, an opposing closed end, and a reduced diameter region disposed between the open end and the closed end;
   b. a material dispensing system disposed in the outer container, the material dispensing system comprising:
      i. a collapsible bag comprising at least two distinct chambers separated by a dividing wall made of the same material as the rest of the collapsible bag said collapsible bag comprising a bag open end and a bag closed end;
      ii. a valve disposed in the bag open end; and
      iii. an elastic member having a length of less than about 2 inches in an unstretched configuration, said elastic member surrounding at least a portion of the bag and being affixed to the bag closed end either chemically or via mechanical means beyond mere friction; and
   c. a personal care composition comprising a first composition and a second composition each composition contained within one of the said at least two distinct chambers, the personal care composition disposed within the collapsible bag such that the elastic member is stretched both axially and radially, and comprises potential energy in connection with being stretched;
   whereupon opening the valve, the personal care composition is permitted to flow out of the collapsible bag via the potential energy from the elastic member being applied to the bag, and wherein as the potential energy dissipates the elastic member shrinks both axially and radially towards its unstretched configuration.

* * * * *